United States Patent [19]

Severson

[11] 4,298,420
[45] Nov. 3, 1981

[54] LOCKING DEVICE FOR CURING RIMS

[75] Inventor: Larry A. Severson, West Fargo, N. Dak.

[73] Assignee: Branick Mfg., Inc., Fargo, N. Dak.

[21] Appl. No.: 134,426

[22] Filed: Mar. 27, 1980

[51] Int. Cl.³ .......................................... B29H 5/02
[52] U.S. Cl. .............................. 156/394 R; 425/17; 425/36; 425/47
[58] Field of Search ............. 156/96, 394 FM, 394 R, 156/414; 425/15, 17, 23, 27, 36, 45

[56] References Cited

U.S. PATENT DOCUMENTS

| | | | |
|---|---|---|---|
| 2,115,349 | 4/1938 | Taylor | 425/17 |
| 2,835,922 | 5/1958 | Fassero et al. | 425/17 |
| 2,871,518 | 2/1959 | Branick | 425/17 |
| 3,114,937 | 12/1963 | Branick | 425/17 |
| 3,133,317 | 5/1964 | Branick | 425/17 |
| 3,227,251 | 1/1966 | Ross | 425/17 |
| 3,341,898 | 9/1967 | Branick | 425/17 |
| 3,886,028 | 5/1975 | Hindin et al. | 156/394 |
| 4,011,125 | 3/1977 | Pelletier | 156/394 |
| 4,051,881 | 10/1977 | Peterson | 144/288 A |

Primary Examiner—John E. Kittle
Attorney, Agent, or Firm—Merchant, Gould, Smith, Edell, Welter & Schmidt

[57] ABSTRACT

A curing rim comprising two abutting, coaxial, relatively rotatable sleeves (11, 12), one having radially inward bosses (20) and the other having axially projecting hooks (21) which can rotate into engagement with the bosses to prevent axial displacement between the sleeves. A latch hook (30) is pivoted to one of the hooks and resiliently engages the apposed boss to prevent rotation between the sleeves. A push bar (24) is passed through a pair of loops (22 and 23) and has a projection (37) which can engage the latch hook to disable its function.

3 Claims, 4 Drawing Figures

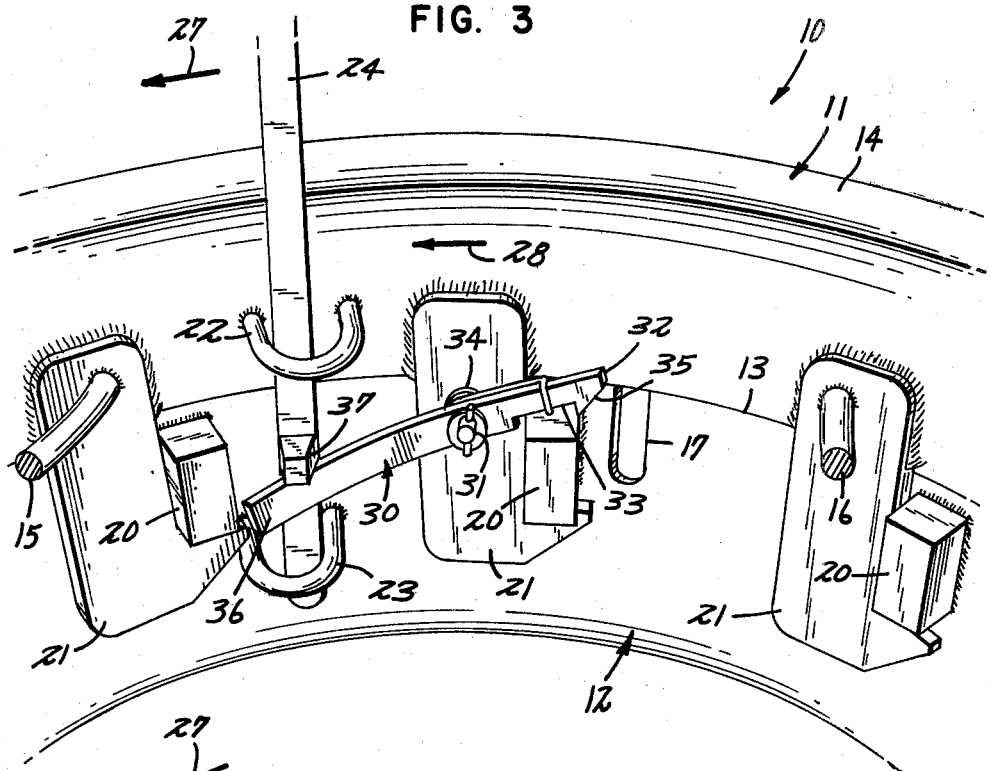
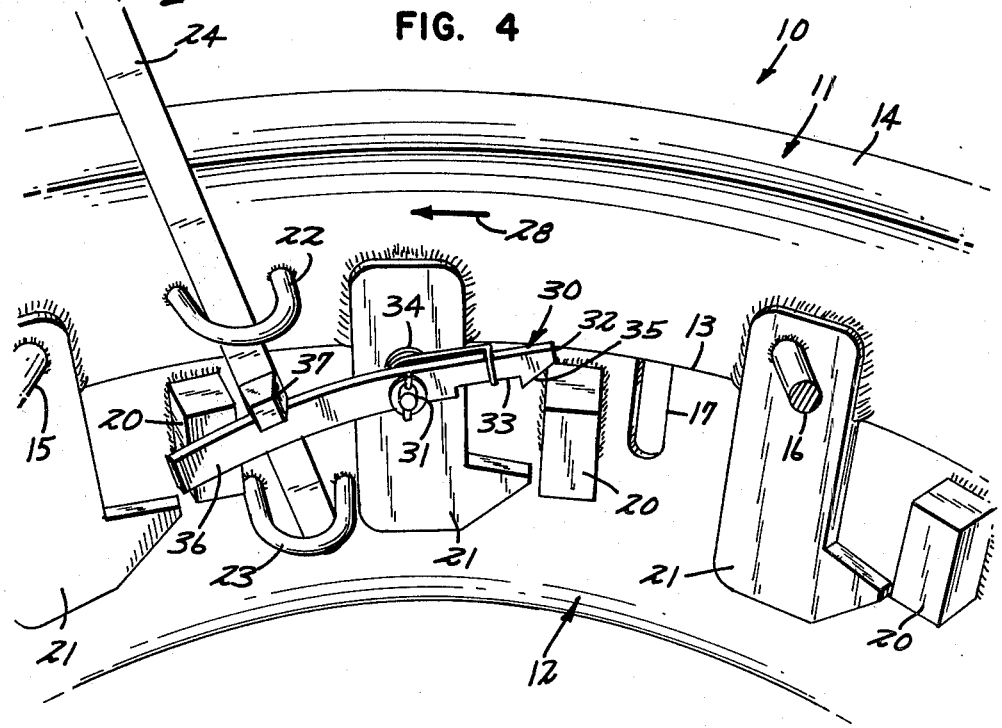

LOCKING DEVICE FOR CURING RIMS

TECHNICAL FIELD

This invention relates to the field of automotive mechanics, and particularly to a method and apparatus to be used in conjunction with the curing of vehicle tires.

BACKGROUND OF THE PRIOR ART

In the process of retreading tires, it is known to mount the tire on a "curing rim" for support during the procedures of buffing, retreading, curing, and the like. Such curing rims must be readily insertable into a tire initially, and readily removable from the tire after completion of the work, and must securely hold the tire during the work processes which include inflation of the tire so as to force the casing into satisfactory engagement with a curing mold which surrounds the tire at this time.

A curing rim suitable for this use is shown in U.S. Pat. No. 3,133,317 to C. E. Branick. It comprises a pair of half-rims or sleeves in axial apposition yet capable of limited relative rotation, together with locking hooks and lugs effective in a pre-determined relative rotated position of the sleeves to prevent axial separation therebetween. The sleeves have outward flanges to engage the bead of a tire. Handle rods are shown for enabling manual rotation of one sleeve relative to the other. In use, one sleeve is laid flat on a suitable support and the tire to be worked on is lifted and laid in the sleeve: the other sleeve is lifted and laid on the tire and first sleeve, and relatively rotated with respect thereto until the locking hooks and lugs are in engagement. The tire can then be placed in the mold, inflated, and retreaded in the usual manner.

While the structure just described is fully operative for its intended purpose, it suffers from certain imperfections. It is possible for the forces active during the procedures to cause reverse relative rotation between the sleeves, until the hooks and lugs are positionally disabled, allowing the sleeves to separate. Also to be borne in mind is the fact that the sleeves and the tires themselves, particularly in larger commercial sizes, are of considerable bulk and weight, and hence are difficult to lift and position, and moreover provide very considerable resistance to the relative rotation between the sleeves which is necessary for effective operation of the locking hooks and lugs.

BRIEF SUMMARY OF THE INVENTION

The present invention is designed to prevent any unintended reverse rotation between a pair of sleeves, and to enable the use of the mechanical advantage of leverage to lessen the force required to cause the relative rotation therebetween needed to operate and release the axial locking devices: the lever or push bar is designed to automatically disable the rotation preventing means when it is desired to release the finished tire. To accomplish this the pair of sleeves are provided with inter-engagable bosses and locking hooks, and with axially spaced rim loops which are circumferentially aligned when the hooks engage the bosses. A push bar passed through the loops enables application of leverage to cause the relative rotation desired, in either direction. Finally, a latch hook is pivotally connected to one of the sleeves. One end of the hook is resiliently urged into a position in which it engages one of the bosses after the hooks engage the bosses, to prevent further relative rotation between the sleeves. The other end of the latch hook projects into the space between the rim loops, for engagement by a projection of the rim bar to disable the rotation preventing function at the same time the rim bar is being used to cause reverse rotation of the sleeves.

Various advantages and features of novelty which characterize the invention are pointed out with particularity in the claims annexed hereto and forming a part hereof. However, for a better understanding of the invention, its advantages, and objects obtained by its use, reference should be had to the drawings which forms a further part hereof, and to the accompanying descriptive matter, in which there is illustrated and described a preferred embodiment of the invention.

In the drawing like reference numerals indicate corresponding parts throughout the several views.

BRIEF DESCRIPTION OF THE DRAWINGS

FIGS. 3 and 4 are views like FIG. 2 showing the steps followed in opening a curing rim according to the invention.

DESCRIPTION OF THE PREFERRED EMBODIMENT

Figures 1, 2:
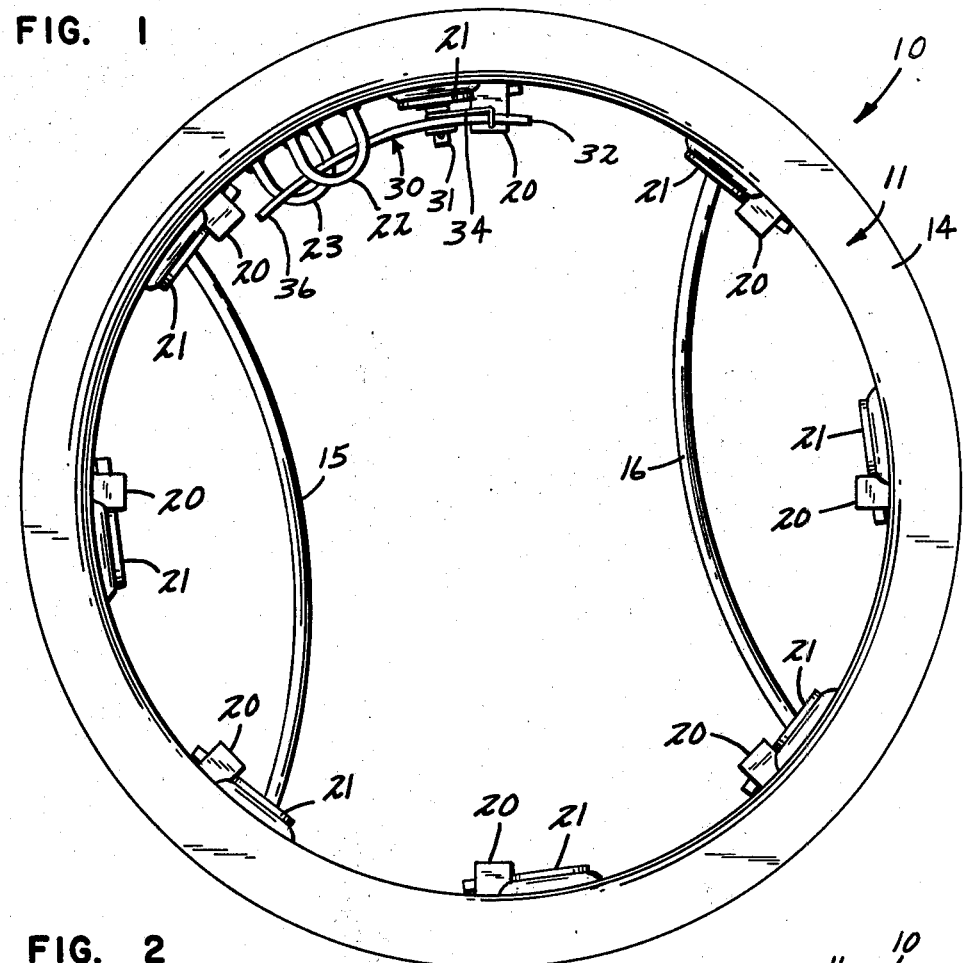
FIG. 1 is a plan view of an assembled curing rim according to the invention.
FIG. 2 is a detailed view showing a latch hook is operative position.

A curing rim 10 according to the invention is shown to be made up of upper and lower hollow cylindrical sleeves 11 and 12 of like diameter, coaxially arranged for circumferential abutment along a contact circle 13. Sleeve 11 has an outwardly extending flange 14 around its upper rim, and sleeve 12 has a similar flange around its lower rim, for engaging the beads of a tire to be mounted on the rim. Sleeve 12 is provided with lifting handles 15, 16 to facilitate lifting and positioning of the sleeve, and sleeve 12 is provided with a slot 17 to enable passage of an air tube for a pneumatic inflater which is positioned within the tire being worked on and hence outward of the sleeves.

To prevent axial separation of sleeves 11 and 12 under the very considerable forces involved, lower sleeve 12 is provided with a plurality of bosses 20 projecting inwardly along contact circle 13, and upper sleeve 11 is provided with a like plurality of inward hook members 21 projecting axially beyond contact circle 13. When sleeve 11 is rotated on sleeve 12 in a clockwise direction as seen in FIG. 1, hooks 21 engage under bosses 20 to hold the sleeves together along the contact circle, to define a locking position of the sleeves shown in FIG. 2.

An inward loop 22 is welded to sleeve 11, and a similar loop 23 is welded to sleeve 12. The loops are positioned for approximate circumferential alignment when the sleeves are in the locking position, and are axially spaced in the assembled rim. While it is possible to rotate sleeve 11 on sleeve 12, within a tire, by manual force applied to handles 15, 16, the rotation is more readily accomplished by leverage against the loops, in one direction or the other, using a push bar 24. The push bar is shown in broken lines in FIG. 2 as being used to cause locking of the rim, as indicated by the arrows 25 and 26, and in solid lines in FIGS. 3 and 4 as being used to cause unlocking rotation between the sleeves, as indicated by the arrows 27 and 28.

It has been found that the forces acting during the work on a tire sometimes cause reverse rotation between the sleeves sufficient to disengage hooks 21 from bosses 20. In order to prevent this, a latch hook 30 is pivoted to one of hooks 21 at a pin 31. Hook 30 is provided at a first end 32 with a notch 33 configured to engage the adjacent boss 20, and is resiliently urged toward the boss by a spring 34. End 32 of hook 30 is provided with a ramp 35: the other end 36 is arcuate about the axis of the sleeves, and extends between loops 22 and 23. Sufficient space exists between hook 30 and the sleeve surfaces to permit the passage of bar 24, which is provided with a lug or projection 37 for engaging end 36 of the hook.

Operation

In use, sleeve 12 is placed on a suitable support, with its flange downward. An inflater is inserted in the tire to be treated, and the tire is lifted and placed over sleeve 12 with its lower bead engaging the flange of the sleeve, and with the air tube emerging through slot 17. Sleeve 11 is now lifted by handles 15 and 16, its flange being uppermost, and is positioned over sleeve 12 and the tire, with loops 22 and 23 in approximate circumferential alignment, and with hooks 21 apposed to bosses 20. In this position, loop 22 acts as a stop, engaging end 36 of hook 30. Now bar 24 is passed through loop 22, behind hook 30, and through loop 23, so that projection 37 engages end 36 of the hook. This raises end 32 so that ramp 35 may slide up boss 20 as the bar is used to apply leverage, in the sense shown in FIG. 2, to rotate sleeve 11 on sleeve 12, and the tire, into locking position, where the hooks engage the bosses circumferentially and axially. Notch 33 engages the adjacent boss 20, and bar 24 may now be removed. The tire is now securely held in the curing rim, and inflation and work procedures may be carried out, without danger of inadvertent separation of the sleeves.

When it is desired to remove the tire, the tire is deflated, bar 24 is inserted through the loops as indicated in FIG. 3, with projection 37 engaging hook 30. Downward pressure on the bar releases notch 33 from boss 20, and leverage in the direction of arrow 27 rotates sleeve 11 on sleeve 12, in the direction of arrow 28, until hooks 21 clear bosses 20. Bar 24 may now be removed and sleeve 11 may be lifted from sleeve 12, enabling the removal of the completed tire.

From the foregoing, it will be evident that the invention comprises an arrangement for insuring safe operation of a separable tire curing rim, which comprises the provision of releasable means for preventing relative rotation between the sleeves of the rim, comprising a latch hook, means movably actuating the latch into a position where it prevents rotation between the sleeves, and means, including a push rod, causing the relative rotation of the sleeves in either direction, the push rod being modified for releasing the latch hook to enable the reverse direction when desired.

Numerous characteristics and advantage of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the term in which the appended claims are expressed.

What is claimed is:

1. In a tire curing rim, in combination:
   a rim assembly including first and second hollow cylindrical sleeves axially arranged for circumferential abutment along a contact circle and for relative rotation about the axis between a first, locking position and a second, release position;
   means for preventing axial movement between said sleeves in said first locking position comprising a plurality of bosses projecting radially inward from said first sleeve adjacent said contact circle, and a plurality of hook members projecting axially beyond said contact circle inwardly of said second sleeve, for engagement with said bosses in said first position of said sleeves;
   releasable latch means for preventing relative rotation of said sleeves out of said first position, said latch means comprising a latch hook pivotally mounted on said first sleeve for engagement with one of said bosses in said first position of said sleeves and resilient means for releasably urging said latch hook into engagement with said boss;
   a pair of axially spaced rim loops projecting inwardly from said first and second sleeves respectively in substantially aligned circumferential relation when said sleeves are in said first position; and
   a push bar received in said rim loops actuable to apply leverage between said sleeves about an axis generally orthogonal to the common axis of the sleeves causing said relative rotation of said sleeves, said push bar including means to disable said resilient means while applying said leverage.

2. A tire curing rim according to claim 1 wherein the latch means comprises a pivoted latch hook on one sleeve having a first end projecting into the space between said loops for engagement by said push bar, a second end configured to engage a boss of said other sleeve peripherally to prevent said relative rotation, and said resilient means releasably urging said second end into engagement with said other sleeve.

3. A tire curing rim according to claim 2, including a projection on said bar for engaging said first end of said latch hook to pivot said second end out of engagement with said one boss on said other sleeve.

* * * * *

UNITED STATES PATENT AND TRADEMARK OFFICE
CERTIFICATE OF CORRECTION

PATENT NO. : 4,298,420
DATED : November 3, 1981
INVENTOR(S) : Larry A. Severson

It is certified that error appears in the above—identified patent and that said Letters Patent is hereby corrected as shown below:

Column 2, line 23, "is" (2nd. occurr.) should be --in--.

Column 4, line 3, "advantage" should be --advantages--.

Signed and Sealed this

Ninth Day of August 1983

[SEAL]

Attest:

GERALD J. MOSSINGHOFF

*Attesting Officer*  *Commissioner of Patents and Trademarks*